(12) United States Patent
Barrett et al.

(10) Patent No.: US 11,372,988 B2
(45) Date of Patent: Jun. 28, 2022

(54) SECURE DATA DELETION AND SANITIZATION IN DISTRIBUTED FILE SYSTEMS

(71) Applicant: Raytheon Company, Waltham, MA (US)

(72) Inventors: Nicholas Wayne Barrett, Oro Valley, AZ (US); Gregory Andrew Early, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 395 days.

(21) Appl. No.: 16/451,889

(22) Filed: Jun. 25, 2019

(65) Prior Publication Data

US 2020/0410121 A1 Dec. 31, 2020

(51) Int. Cl.
| | | |
|---|---|---|
| H04L 29/06 | (2006.01) |
| G06F 21/62 | (2013.01) |
| G06F 16/182 | (2019.01) |
| G06F 21/60 | (2013.01) |
| H04L 9/30 | (2006.01) |
| H04L 9/32 | (2006.01) |
| G06F 16/16 | (2019.01) |

(52) U.S. Cl.
CPC ........ *G06F 21/6209* (2013.01); *G06F 16/162* (2019.01); *G06F 16/183* (2019.01); *G06F 21/602* (2013.01); *H04L 9/30* (2013.01); *H04L 9/3242* (2013.01)

(58) Field of Classification Search
CPC ....... H04L 9/30; H04L 9/3242; H04L 9/0894; H04L 9/0643; G06F 16/162; G06F 16/183; G06F 21/6209; G06F 21/6218; G06F 2221/2143; G06F 21/602
See application file for complete search history.

(56) References Cited

U.S. PATENT DOCUMENTS

| | | | |
|---|---|---|---|
| 5,991,778 A | 11/1999 | Starek et al. | |
| 7,526,620 B1 | 4/2009 | Mcgovern | |
| 7,581,118 B2 | 8/2009 | Mcgovern | |
| 7,668,883 B2 | 2/2010 | Tran et al. | |
| 9,805,054 B2 * | 10/2017 | Davis ................. | G06F 16/1752 |
| 2010/0138619 A1* | 6/2010 | Benavides .......... | G06F 21/6218 |
| | | | 711/159 |
| 2016/0119146 A1* | 4/2016 | Anderson ............ | H04L 9/3242 |
| | | | 380/30 |

(Continued)

FOREIGN PATENT DOCUMENTS

| | | |
|---|---|---|
| CN | 107862223 A | 3/2018 |
| EP | 0916131 A2 | 5/1999 |
| EP | 2143034 A1 | 1/2010 |

OTHER PUBLICATIONS

Jantali, Srinivas, et al., "Data Spillage Remediation Techniques in Hadoop", 9th Annual Cyber Security Summit, held Jun. 6-8, 2017, Retrieved from Internet. URL: <https://cdm16608.contentdm.oclc.org/digital/collection/p16608coll30/id/104/>, (Jun. 2017), 11 pgs.

(Continued)

*Primary Examiner* — Tri M Tran
(74) *Attorney, Agent, or Firm* — Schwegman Lundberg & Woessner, P.A.

(57) ABSTRACT

A system deletes and sanitizes files in a distributed file system. The system also randomizes rotation of data in a distributed file system.

10 Claims, 6 Drawing Sheets

(56) References Cited

U.S. PATENT DOCUMENTS

2020/0259800 A1* 8/2020 Masny .................. H04L 9/0861

OTHER PUBLICATIONS

Purdue University, "Data Spillage in Hadoop Clusters", Retrieved from Internet. URL: <http://insurehub.org/sites/default/files/reports/Data%20Spillage%20FinalPresentation%20(3).pdf>, (2012), 20 pgs.

* cited by examiner

SECURE DATA DELETION AND SANITIZATION IN DISTRIBUTED FILE SYSTEMS

TECHNICAL FIELD

The present disclosure relates to secure data deletion and sanitization.

BACKGROUND

Large distributed data platforms, such as the Hadoop Distributed File System (HDFS), that store sensitive information face a problem when information of a higher classification is mistakenly entered because there are no good options to ensure the proper deletion and sanitization of the mistakenly-entered information. Due to the design of such large platforms like HDFS, information is stored in pieces across many hard drives, servers, and perhaps across thousands of servers. This means that complete sanitization requires either a destructive deletion of the platform or taking the entire platform offline to perform server-by-server sanitization and letting the system rebuild itself over several days. Both these options are unacceptable, so using large data platforms in a lower security environment that deal with technical data pose a significant operational risk.

DETAILED DESCRIPTION

In the following description, for purposes of explanation, numerous specific details are set forth in order to provide a thorough understanding of the various aspects of different embodiments of the present invention. It will be evident, however, to one skilled in the art that the present invention may be practiced without all the specific details and/or with variations, permutations, and combinations of the various features and elements described herein.

Prior attempts to address the data spillage problem described above fall short of an ideal or even a production grade solution. One approach that specifically deals with a Hadoop environment suggests enhanced Hadoop binaries. However, this approach is inadequate and requires platform-specific shell script invocation. Another source has recommended that there be an automation of the data removal process in a Hadoop Distributed File System (HDFS). However, while many in the Hadoop and other large data platform environments recognize the problem, many, when dealing with sensitive or higher-classification data, just put the whole Hadoop or large data platform cluster behind a secure wall in a secured area. However, this isn't an option for some information technology shops, especially those that deal with the U.S. government and the U.S. Military. Others often do nothing or very little, and simply plan on forced downtime and wiping or removing whole disks if an incident was to occur. In general, the problem is that once data are deleted, the low-lying disk sectors become dynamically allocated to another file, which means that the old data is not truly sanitized before the new data are written where the old data recently resided, and the old data can then be retrieved by unauthorized systems or unauthorized users with common data recover tools.

Figure 1:
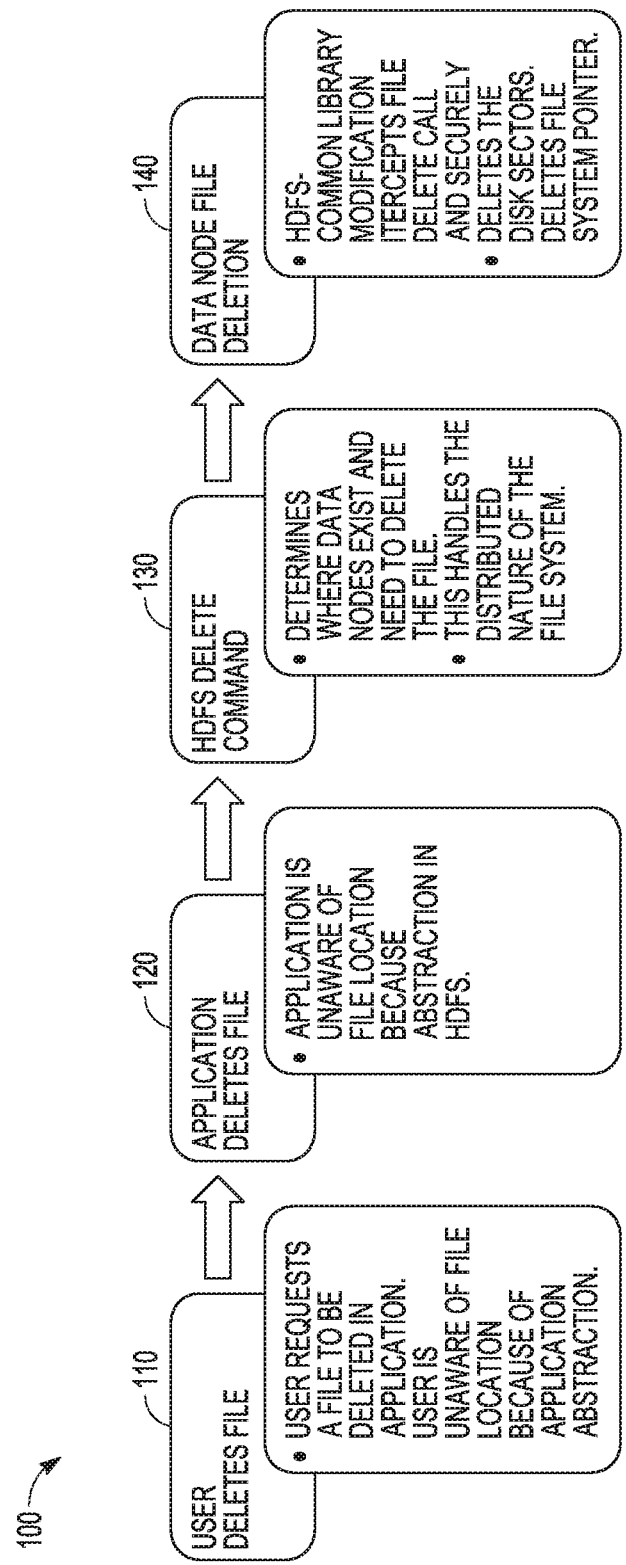
FIG. 1 is a block diagram of features and operations of a process to delete and sanitize files in a distributed file system.

This disclosure addresses these issues via at least two embodiments that that solve the problem of secure deletion and whitespace or free disk space deletion. Referring to FIG. 1, in a first embodiment 100, a user at 110 indicates that he or she would like to delete a file. As noted at 110, the user is unaware of the file location because of the abstraction of the file system, such as the inherent abstraction of HDFS. At 120, the application receives the user command to delete the file, but the application also is unaware of the file location because of the abstraction of the file system. At 130, the distributed file system invokes the necessary operations to delete the file by determining where the distributed data nodes exist for this file. This operation handles the distributed nature of the file system. At 140, the first embodiment handles the deletion of the data nodes. That is, the code that handles the deletion of the data nodes has been modified to intercept the deletion call, deletes the disk sectors, and deletes the system pointer to the just-deleted file.

More specifically, in this first embodiment, modified libraries of Apache Hadoop common HDFS source code provide direct disk access to use a configurable number of passes (e.g., 7 passes) to overwrite the data. In an embodiment, the data are overwritten with an AES-256 bit hash of randomized data using a persistent public key or a one-time use key. A new key can be provided for each of the number of passes. This overwriting provides sufficient entropy of the data to make recovery impossible, even with the best of data recovery tools. A particular example of this embodiment detects all relevant copies of a file via an HDFS low level API and a Java direct disk access library. That is, delete calls or operations in the library, such as the Hadoop-common library, are modified and redirected to the Java direct disk access library. In a HDFS Java-based system, the delete calls (i.e., java.io.file.delete( )) are replaced with extra code that performs the multi-pass delete of this embodiment. Through runtime or persistent configuration, the configurable deletion leaves no trace of the deleted file. Moreover, in this embodiment, there is no reliance on a complex, per file encryption key infrastructure.

A second embodiment involves performing low-priority processes that overwrite whitespace and data space when disk utilization is low using a multi-pass technique, and further moving data around (similar to a disk defragmenter) to ensure that unauthorized data that have been over-written once gets overwritten multiple times during a short time period (e.g., in a week). This ensures that both free disk space and utilized space are constantly overwritten. This overwriting constantly shuffles the data on disk at night (or other low utilization times), thereby preserving the file system integrity, but keeping the disk overwriting high, and ensures that past historical disk locations of data are over-written several times per given time period. This embodiment provides advanced assurance and integrity of user data and removal of identified data in a way that current distributed file system (DFS) offerings by many cloud providers do not offer. Rather, cloud providers typically leave it up to the customer to add on supplemental protections such as data encryption with a user provided key. Upon closeout of the cloud service, the onus is on the customer to revoke the certificate key to render the residual data unrecoverable. Many a time however, the physical sectors on the disks are not sanitized or destroyed per U.S. government or U.S. Department of Defense requirements until the end of life of the identified disk asset.

Consequently, an embodiment performs native, built-in secure file deletion in a large data platform environment such as the HDFS library using a configurable number of passes and with sufficient entropy to ensure sanitization. This embodiment is applicable to the Hadoop big data platform and many other cloud-provided distributed file systems. Additionally, an embodiment that uses persistent random disk rotation of data to ensure both whitespace and utilized disk space are overwritten not only provides sanitization of the locations where unauthorized files currently exist, but also where the files were located in the past. This is accomplished through a constant movement of data on disk, so that prior locations of now-deleted data are overwritten a minimum number of times (which is a customizable number) producing "eventual sanitization" within days.

A particular example of the first embodiment, wherein modified libraries of Apache Hadoop common HDFS source code provide direct disk access to use a configurable number of passes to overwrite the data, can be implemented as follows. The system first determines if the file to be deleted exists on the system. If it does, then the execution continues. If not, then execution of the delete command ceases and control is returned to the calling process. If execution proceeds, a loop is begun based on the desired number of wipes of the data (e.g., seven wipes). For each execution of the loop, the system determines the length of the file to be deleted in bytes, and reads in the full file contents into a byte array. The process then obtains a file pointer by, for example, using RandomAccessFile API in the HDFS Java-based system for direct disk access. The process proceeds to the beginning of the disk writing position as indicated by the pointer, and in blocks of 4K bytes, the system creates random byte values and hashes them with a one-time Type 4 (pseudo randomly generated) UUID. The UUID is generated using a cryptographically strong pseudo random number generator. Hashing can be made with AES/ECB/PKCS5 Padding cipher. The process then writes the hashed data over the original file's exact disk sectors that are to be deleted. The process then synchronizes the change to the file descriptor, and closes the file I/O connection. The process thereafter loops back to the operation of reading in the full file contents into a byte array. After the loop is completed, the original file reference is deleted. The prior location of the deleted file now contains multi-pass written random bytes.

Figure 2:
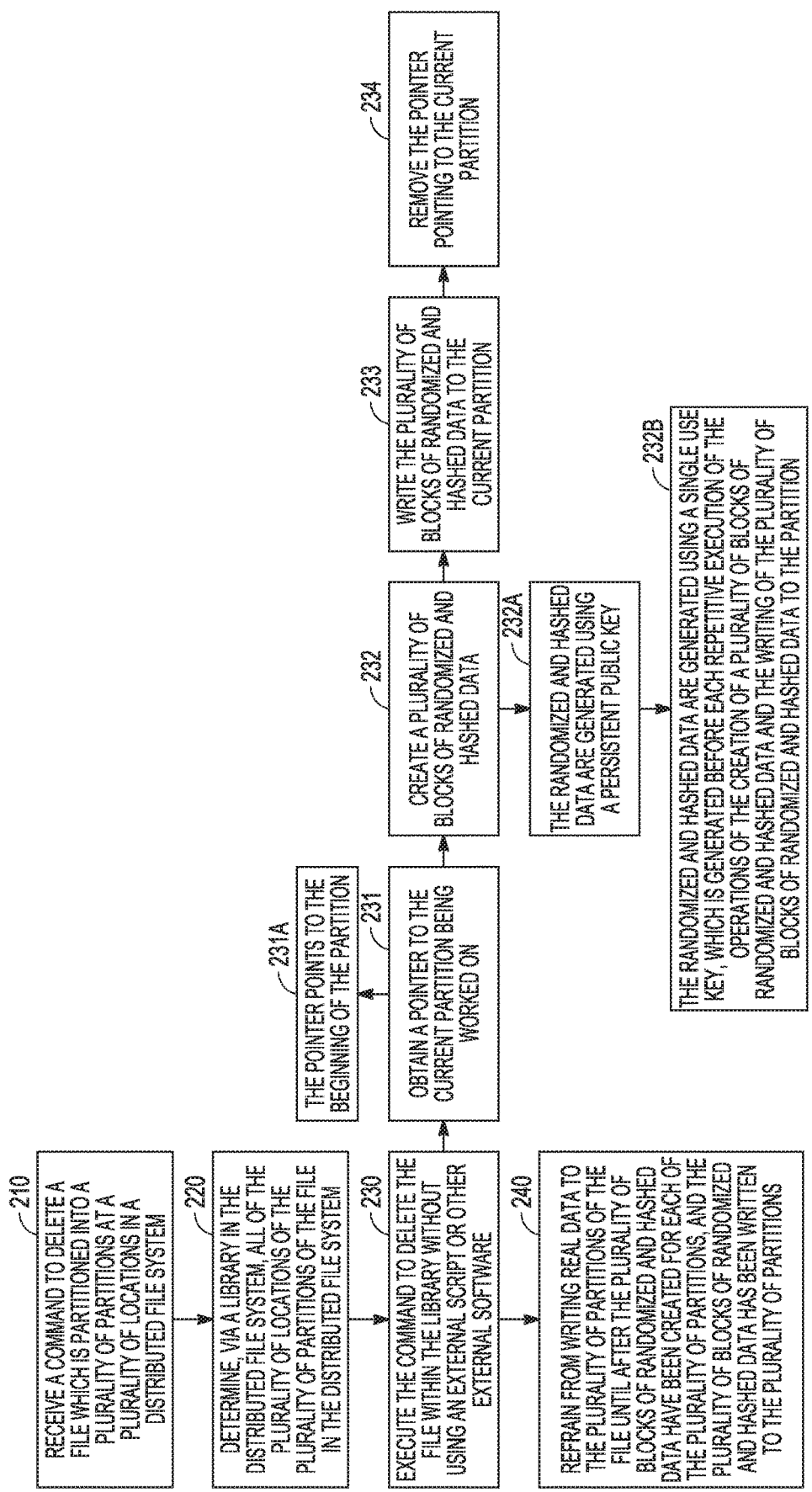
FIG. 2 is another block diagram of features and operations of a process to delete and sanitize files in a distributed file system.

Another form of this process is illustrated in FIG. 2, which is a block diagram illustrating operations and features of a process to delete and sanitize files in a distributed or non-distributed file system. FIG. 2 includes process blocks 210-240. Though arranged substantially serially in the example of FIG. 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 2, at 210, a command to delete a file is received. In an embodiment, the command is received into a computer processor in a library in a distributed file system. Further in an embodiment, the file is partitioned into a plurality of partitions at a plurality of locations in the distributed file system. The plurality of locations of the file can include one or more of servers, disk drives, disks within the disk drives, and sectors on disks. At 220, the process determines, via the library in the distributed file system, all of the plurality of locations of the plurality of partitions of the file in the distributed file system. At 230, the command to delete the file is executed within the computer processor in the library without using an external script or other external software.

The command to delete the file at operation 230 includes several sub-operations, and these sub-operations are executed for each of the plurality of partitions at the plurality of locations of the file. At 231, a pointer to the current partition being worked on is obtained. Normally, the pointer will point to the beginning of the partition (231A). At 232, a plurality of blocks of randomized and hashed data is created. In an embodiment, as indicated at 232A, the randomized and hashed data are generated using a persistent public key. At 232B, the randomized and hashed data are generated using a single use key. The single use key is generated before each repetitive execution of the operations of the creation of a plurality of blocks of randomized and hashed data and the writing of the plurality of blocks of randomized and hashed data to the partition. At 233 the plurality of blocks of randomized and hashed data is written to the current partition. Then, operations 232 and 233 are repeated several times. In an embodiment, operations 232 and 233 are repeated from five to ten times. This repetition of operations 232 and 233 causes the original data on that partition to be overwritten multiple times, so that the original data on that partition essentially become irrecoverable. Then, at 234, the pointer pointing to the current partition is removed.

As indicated at 240, the process refrains from writing real data to the plurality of partitions of the file until after the plurality of blocks of randomized and hashed data has been created for each of the plurality of partitions, and the plurality of blocks of randomized and hashed data has been written to the plurality of partitions. This ensures that the underlying original data has been sufficiently sanitized before real replacement data are written to the partitions (and no further sanitation would take place for the foreseeable future).

Figure 3:
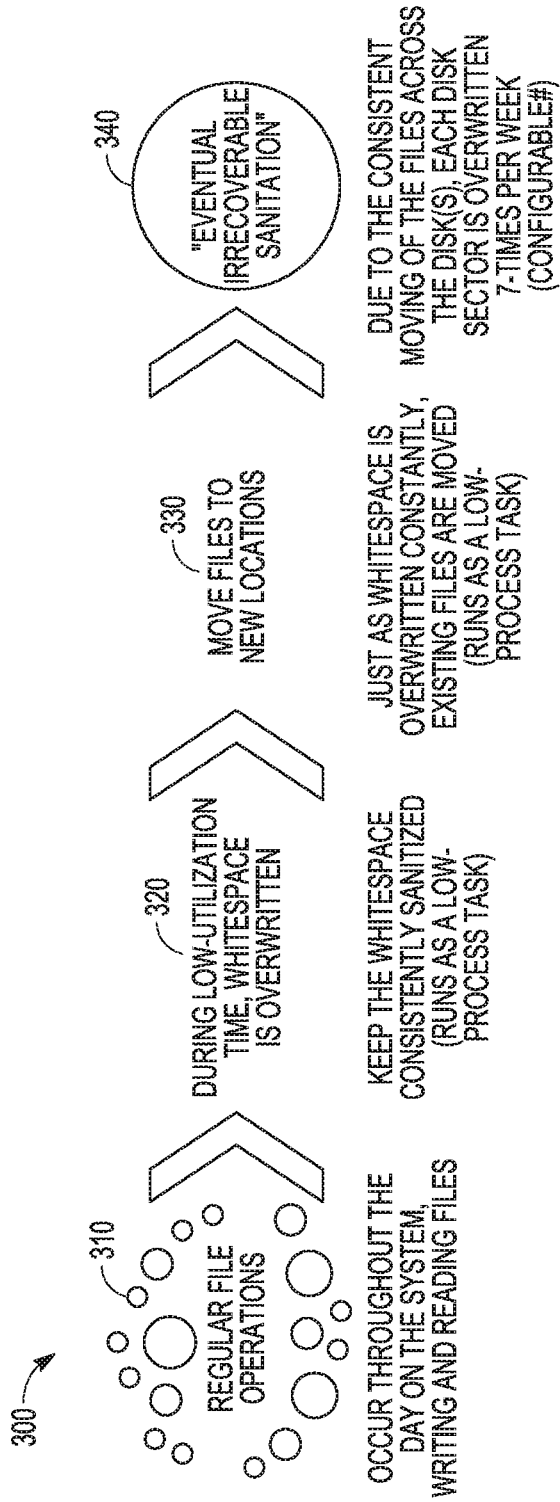
FIG. 3 is a block diagram of features and operations of a process of random disk rotation in a distributed file system.

FIG. 3 is a block diagram of features and operations of a process 300 of random disk rotation in a distributed file system. As indicated at 310, regular file operations occur throughout the day in a computer system, that is for example, reading from and writing to files. At 320, the process overwrites whitespace during low utilization times of the system. This low priority process task keeps the whitespace consistently sanitized. Then at 330, just as the whitespace is constantly overwritten, existing files on the system are moved around and about the system. This movement of the files is also executed as a low-priority process. At 340, due to the constant and consistent moving of files across disks, each disk sector is overwritten a configurable number of times per time period (e.g., seven times per week), thereby resulting in eventual irrecoverable sanitation.

Figure 4:
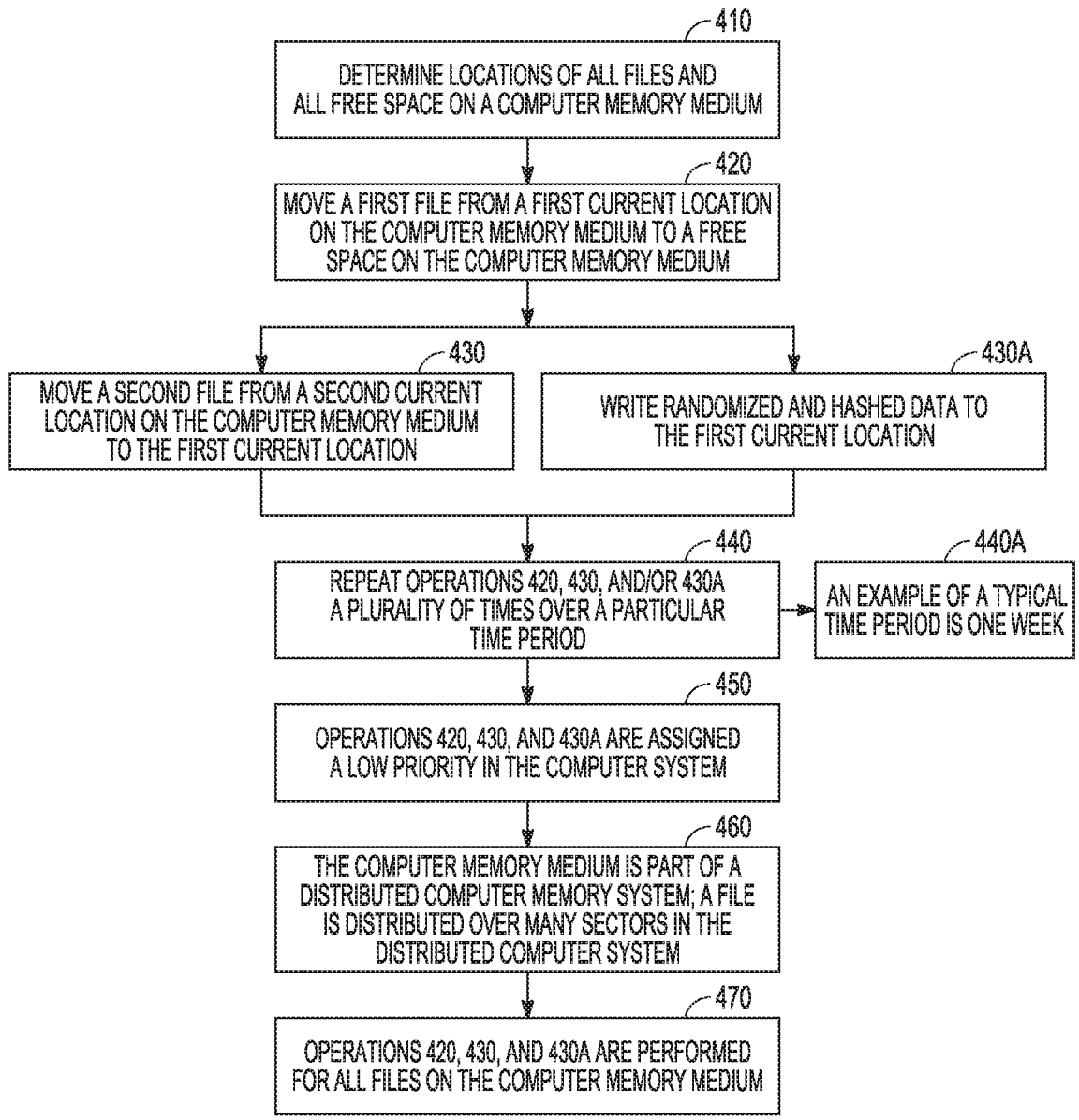
FIG. 4 is another block diagram of features and operations of a process of random disk rotation in a distributed file system.

FIG. 4 is another block diagram of features and operations of a process of random disk rotation in a distributed file system. FIG. 4 includes process blocks 410-470. Though arranged substantially serially in the example of FIG. 4, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 4, at 410, locations of all files and all free space on a computer memory medium are determined. Then, for a plurality of files on the computer memory medium the following operations are executed.

Figure 5:
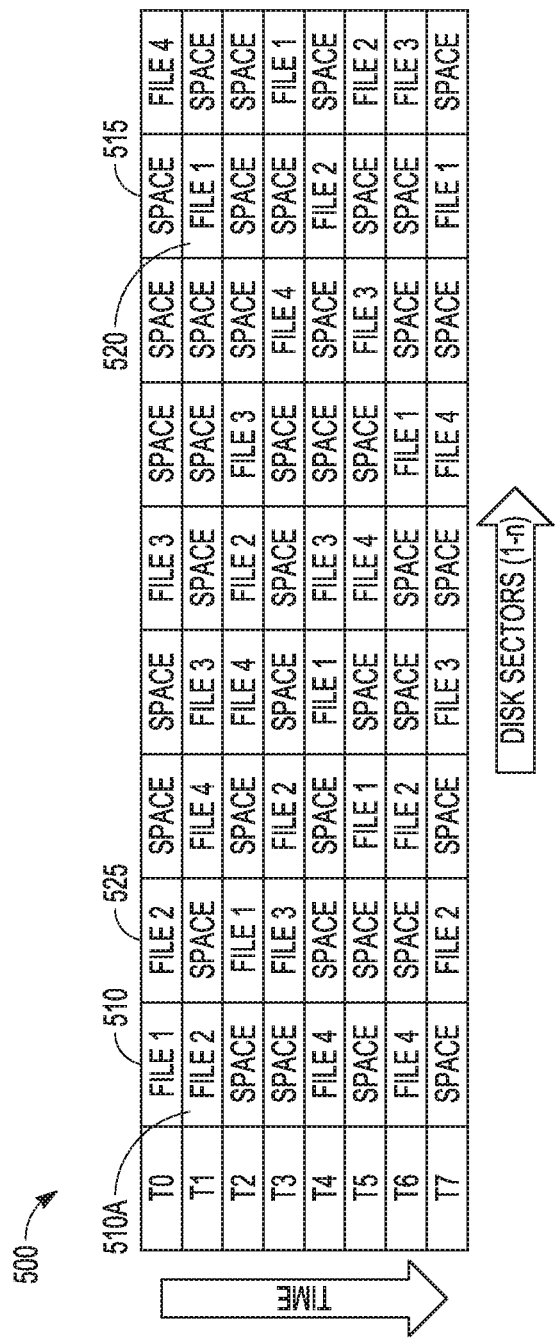
FIG. 5 is a chart illustrating an example of a random disk rotation.

At 420, a first file is moved from a first current location on the computer memory medium to a free space on the computer memory medium. Referring to FIG. 5, this is illustrated in an example as moving File No. 1 from its current location at 510 to the free space location 515 so that File No. 1 then resides at 520. Then in a second operation at 430, a second File No. 2 is moved from a second current location 525 on the computer memory medium to the first current location 510A (that is, the location 510 where File No. 1 was just before it was moved). Alternatively, at 430A, randomized and hashed data are written to the first current location 510, 510A (where File No. 1 was before just being moved).

At operation 440, the system repeats operations 420, 430, and/or 430A a plurality of times over a particular time period. As indicated at 440A, an example of a typical time period is one week. The result of this repetition of operations 420, 430, and/or 430A is that the location where File No. 1 was at the beginning of the operations (and for many files other than File No. 1), is that the location where File No. 1 was originally has been overwritten so many times that the data from File No. 1 at that original memory location is now virtually unrecoverable.

As indicated at 450, the operations 420, 430, and 430A are assigned a low priority in the computer system, such that these operations execute when computer processor utilization and/or computer storage disk utilization is low.

As indicated at 460, the computer memory medium can be part of a distributed computer memory system. Additionally, a certain file can be distributed over many sectors in the distributed computer system.

As indicated at 470, operations 420, 430, and 430A can be performed for all files on the computer memory medium.

Figure 6:
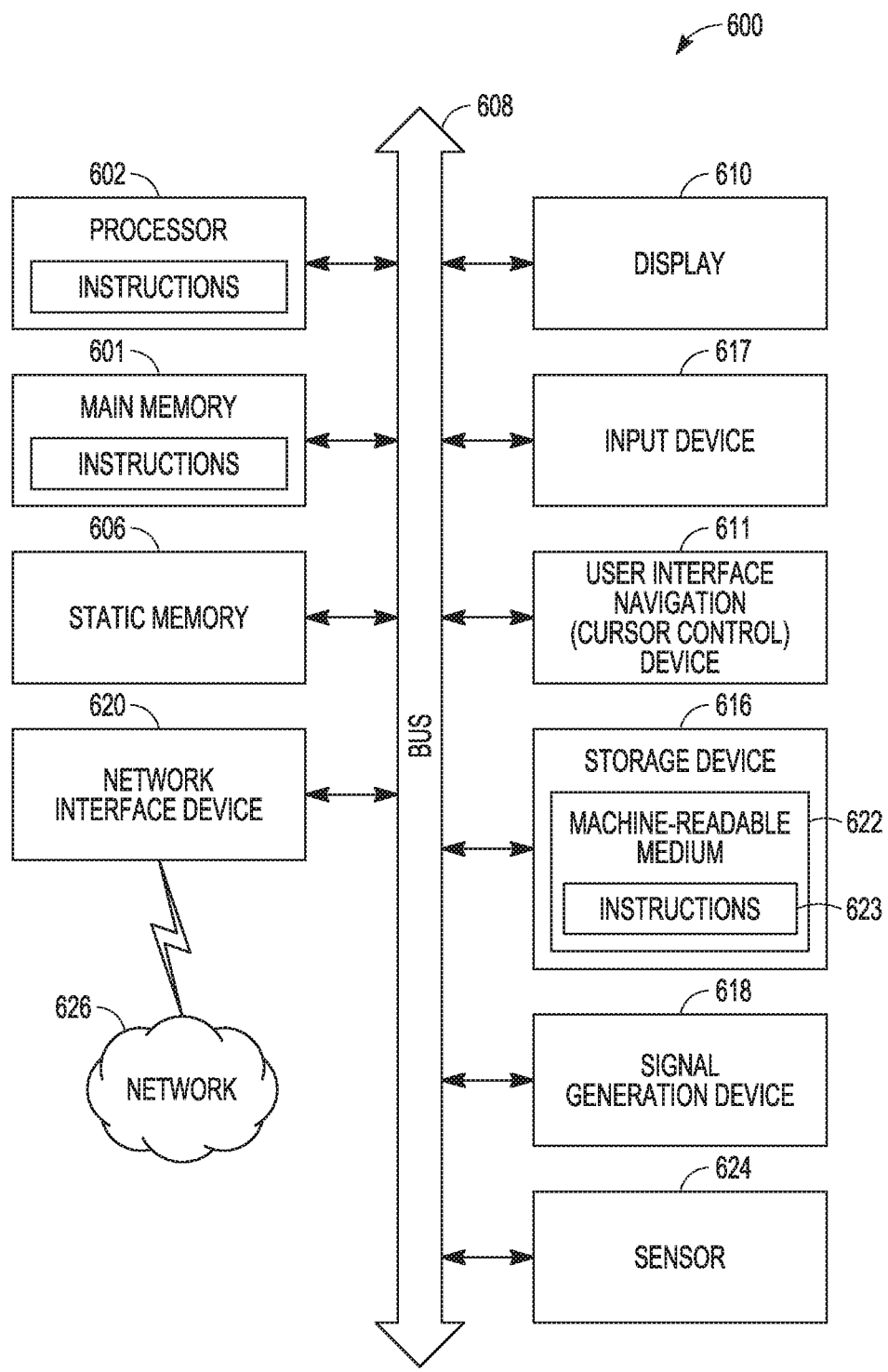
FIG. 6 is a block diagram of a computer system upon which one or more embodiments of the present disclosure can execute.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. The computer system 600 may additionally include a storage device 616 (e.g., drive unit), a signal generation device 618 (e.g., a speaker), a network interface device 620, and one or more sensors 621, such as a global positioning system sensor, compass, accelerometer, or other sensor.

The drive unit 616 includes a machine-readable medium 622 on which is stored one or more sets of instructions and data structures (e.g., software 623) embodying or utilized by any one or more of the methodologies or functions described herein. The software 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

The invention claimed is:

1. A process comprising:
receiving, into a computer processor in a library in a distributed file system, a command to delete a file, wherein the file is partitioned into a plurality of partitions at a plurality of locations in the distributed file system;
determining, via the library in the distributed file system, all of the plurality of locations of the plurality of partitions of the file in the distributed file system; and
executing, within the computer processor in the library without using an external script or other external software, the command to delete the file;
wherein the command to delete the file comprises:
for each of the plurality of partitions at the plurality of locations of the file:
(a) obtaining a pointer to the partition;
(b) creating a plurality of blocks of randomized and hashed data;
(c) writing the plurality of blocks of randomized and hashed data to the partition;
(d) repeating operations (b) and (c) a plurality of times; and
(e) removing the pointer to the partition;
wherein the command to delete the file received in the library is modified to execute operations (a)-(e), and the modified command is redirected to a second library for execution;
wherein the randomized and hashed data are generated using a single use key; and
wherein the single use key is generated before each execution of operation (d).

2. The process of claim 1, wherein the pointer to the partition points to the beginning of the partition.

3. The process of claim 1, wherein the plurality of locations of the file comprises one or more of a server, a disk drive, a disk within the disk drive, and a sector on the disk.

4. The process of claim 1, wherein the randomized and hashed data are generated using a persistent public key.

5. The process of claim 1, comprising refraining from writing real data to the plurality of partitions of the file until after the operation (d) has been executed for each of the plurality of partitions.

6. A system comprising:
a computer processor; and
a non-transitory computer readable storage medium coupled to the computer processor;
wherein the computer processor comprises instructions that when executed by the computer process execute a process comprising:
receiving, into the computer processor in a library in a distributed file system, a command to delete a file, wherein the file is partitioned into a plurality of partitions at a plurality of locations in the distributed file system;
determining, via the library in the distributed file system, all of the plurality of locations of the plurality of partitions of the file in the distributed file system; and
executing, within the computer processor in the library without using an external script or other external software, the command to delete the file;
wherein the command to delete the file comprises:
for each of the plurality of partitions at the plurality of locations of the file:
(a) obtaining a pointer to the partition;
(b) creating a plurality of blocks of randomized and hashed data;
(c) writing the plurality of blocks of randomized and hashed data to the partition;
(d) repeating operations (b) and (c) a plurality of times; and
(e) removing the pointer to the partition;
wherein the command to delete the file received in the library is modified to execute operations (a)-(e), and the modified command is redirected to a second library for execution;
wherein the randomized and hashed data are generated using a single use key; and
wherein the single use key is generated before each execution of operation (d).

7. The system of claim 6, wherein the pointer to the partition points to the beginning of the partition.

8. The system of claim 6, wherein the plurality of locations of the file comprises one or more of a server, a disk drive, a disk within the disk drive, and a sector on the disk.

9. The system of claim 6, wherein the randomized and hashed data are generated using a persistent public key.

10. The system of claim 6, comprising refraining from writing real data to the plurality of partitions of the file until after the operation (d) has been executed for each of the plurality of partitions.

* * * * *

UNITED STATES PATENT AND TRADEMARK OFFICE
CERTIFICATE OF CORRECTION

| | |
|---|---|
| PATENT NO. | : 11,372,988 B2 |
| APPLICATION NO. | : 16/451889 |
| DATED | : June 28, 2022 |
| INVENTOR(S) | : Barrett et al. |

It is certified that error appears in the above-identified patent and that said Letters Patent is hereby corrected as shown below:

In the Drawings

Sheet 1 of 6, Fig. 1, reference numeral 140, Line 6, delete "ITERCEPTS" and insert --INTERCEPTS-- therefor In the Specification In Column 2, Line 15, delete "that that" and insert --that-- therefor In Column 6, Line 17, delete "621," and insert --624,-- therefor Signed and Sealed this
Fourteenth Day of February, 2023

Katherine Kelly Vidal
*Director of the United States Patent and Trademark Office*